United States Patent [19]

Senior et al.

[11] Patent Number: 4,670,649
[45] Date of Patent: Jun. 2, 1987

[54] OPTICAL TRANSDUCER AND MEASURING DEVICE

[75] Inventors: John M. Senior, Fallowfield; Stewart D. Cusworth, Ashton-under-Lyne, both of England

[73] Assignee: Monicell Limited, England

[21] Appl. No.: 707,062

[22] Filed: Mar. 1, 1985

[30] Foreign Application Priority Data

Mar. 3, 1984 [GB] United Kingdom ............... 8405638

[51] Int. Cl.⁴ .......................... G01D 5/34; G01L 9/00
[52] U.S. Cl. ............................ 250/227; 250/231 P; 73/705
[58] Field of Search ............ 250/231 R, 231 P, 561, 250/227; 73/655, 700, 800, 705; 356/373, 375

[56] References Cited

U.S. PATENT DOCUMENTS

| | | | |
|---|---|---|---|
| 3,273,447 | 9/1966 | Frank | 73/655 |
| 3,327,584 | 6/1967 | Kissinger | 356/375 |
| 3,842,353 | 10/1974 | Stewart | 250/231 P |
| 4,487,206 | 12/1984 | Aagard | 73/705 |

FOREIGN PATENT DOCUMENTS 0165028 9/1983 Japan ............................ 73/705
2010476 11/1978 United Kingdom .

Primary Examiner—David C. Nelms
Assistant Examiner—S. Allen
Attorney, Agent, or Firm—Pravel, Gambrell, Hewitt & Kimball

[57] ABSTRACT

An optical transducer for producing a measurement signal which is modulated in accordance with the position of a physically movable member in the form of a modulating mirror and which also produces a reference signal the intensity of which is independent of the position of the modulating mirror. Both the modulating mirror and a further optical element which is arranged to provide the reference signal are arranged on the optical axis along which a light beam is directed by an input lens. Thus the system can tolerate normally experienced vibrations transverse to the optical axis and can provide for a substantial degree of movement of the modulating mirror.

11 Claims, 9 Drawing Figures

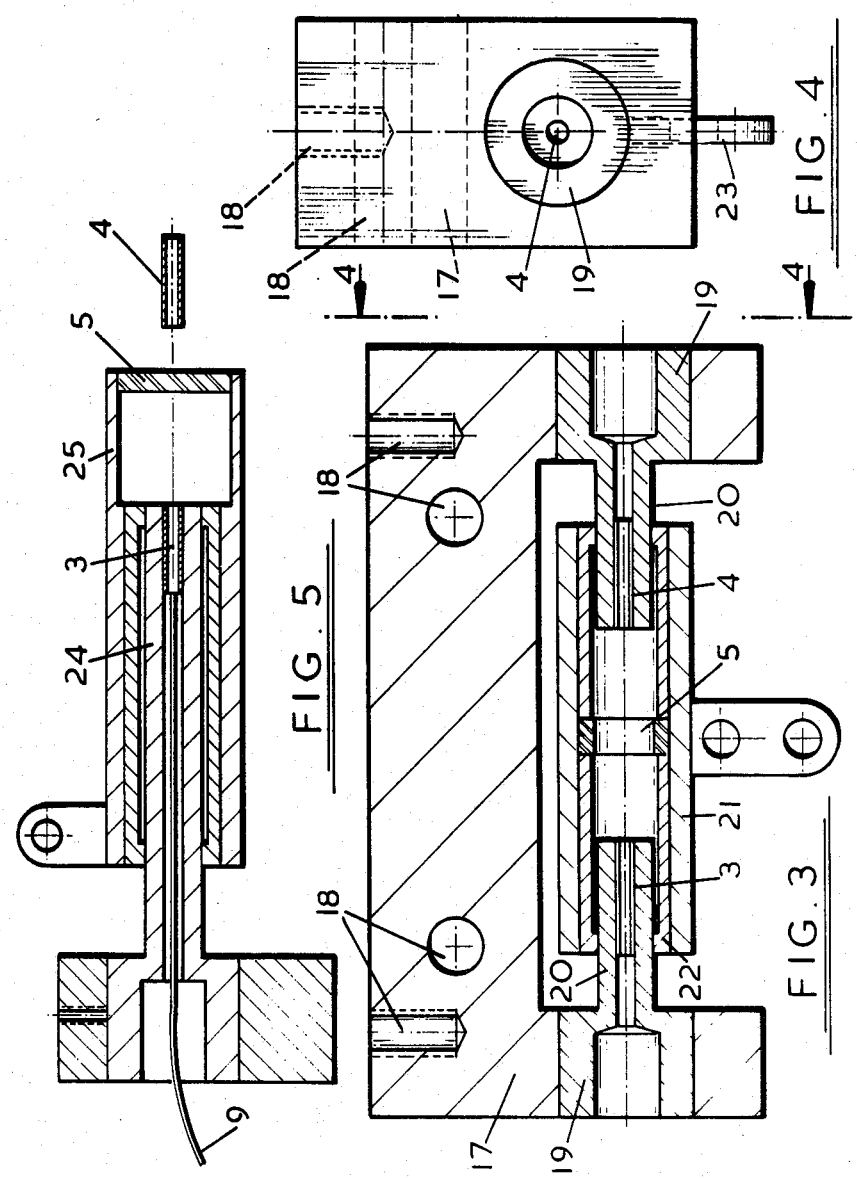

OPTICAL TRANSDUCER AND MEASURING DEVICE

FIELD OF THE INVENTION

The present invention relates to an optical transducer and a measuring device using such a transducer.

DESCRIPTION OF THE RELATED ART

Optical measuring devices are used for a variety of purposes, e.g. for measuring the pressure prevailing in a container. Such devices require optical transducers to modulate an optical beam in response to changes in pressure.

U.S. Pat. No. 3,273,447 describes one known pressure monitoring arrangement in which light is conducted via a first optical fibre to a transducer from a remote light source and returned to optical receiving equipment at the remote location via a second optical fibre. The transducer comprises a flexible membrane having a reflective surface. Light from the first optical fibre is reflected to the second by the membrane, the membrane being arranged so that the proportion of the light from the first fibre which enters the second fibre is a function of the displacement of the membrane surface. The intensity of the light received at the remote location via the second fibre is monitored to provide a measure of the pressure being monitored.

In a measuring device of the above type it is very difficult to maintain accurate calibration as a result of instability in the optical system. Some means is required for providing an optical reference signal at the remote location with which the light returned via the second fibre can be compared so that compenstion can be made for the inevitable instabilities in the system.

British Pat. No. 2,010,476 describes various measuring devices which seek to provide the required reference signal. Essentially the described devices return two optical beams to the remote location both of which are generated from optical beams transmitted to the transducer from a light source or sources located at the remote location. In one arrangement the transducer comprises a mirror movable in response to the parameter to be measured across a single optical beam, one return beam being produced from light reflected by the mirror and the other return beam being produced from that part of the single optical beam not obstructed by the mirror. Thus both returned beams are effectively modulated by the mirror the intensity of one varying inversely with the other. In another arrangement two optical beams are provided, the mirror being positioned to modulate only one of them and thus only one of the returned beams being modulated.

The system of British Pat. No. 2,010,476 suffers from the fact that as the modulating mirror moves across the direction of the beam to be modulated only a very small movement of the mirror produces a full scale deflection because the beam itself has a small diameter. The transducer mechanism producing movement of the mirror in response to variations in the measurement parameter must accordingly be very accurate. Even if the required accuracy can be achieved however very small vibrations of the mirror transverse to the beam can produce wild fluctuations in the output.

U.S. Pat. No. 3,327,584 describes an optical transducer in which a measurement signal is generated by reflecting a light beam from the surface of an object which object is movable parallel to the axis of the light beam. Very small movements of the object do not therefore result in full scale deflection of the transducer output. It is also proposed in U.S. Pat. No. 3,327,584 to provide a reference signal by reflecting a portion of the light beam from a second reflecting surface the position of which is predetermined, the reflected light beams being transmitted through spatially separated return fibres. Unfortunately this reference signal generating arrangement is difficult to set up and is prone to vibration induced instability as the insensity of both the measurement and the reference signals are highly sensitive to the position of the edge of the second reflecting surface. A small movement of the edge of the second reflecting surface transverse to the light beam axis can dramatically change the proportions of the light beam reflected by the object and the second reflecting surface respectively, so that the relationship between the measurement and reference signals cannot be relied upon.

U.S. Pat. No. 3,327,584 also describes an arrangement for generating a reference signal in which the reference signal is transmitted to and returned from the transducer by a transmission path completely spatially separated from the transmission path used to obtain the measurement signal. This avoids the problems encountered in reflecting a proportion of a light beam but makes the relationship between the measurement and reference signals less direct; thereby reducing the reliability of the system.

Despite the fact that optical transducer systems have been known for many years as indicated by the above U.S. patent specification, and their electrical passivity has obvious advantages for remote sensing in hazardous environments such as petro-chemical installations, the problems outlined above have heretofore prevented the general acceptance of such systems.

It is an object of the present invention to provide an optical transducer which can deliver an optical reference signal for calibration purposes and yet which obviates or mitigates the above problems.

SUMMARY OF THE INVENTION

According to the present invention, there is provided an optical transducer comprising an input lens arranged to direct a light beam along a predetermined optical axis, a modulating mirror which is centred on and movable parallel to the said optical axis and which is arranged to reflect back to the input lens a measurement signal related in intensity, to the distance between the lens and the modulating mirror, and a further optical element which is centred on said optical axis in a fixed position relative to the lens and which is arranged to provide a reference signal the intensity of which is independent of the distance between the lens and the modulating mirror.

As both the modulating mirror and the further optical element are centred on the optical axis movements of these components transverse to the optical axis have a negligible effect on the measurement and reference signals. Furthermore, as the modulating mirror is movable parallel to the optical axis vibrations of the modulating mirror and the further optical element in that direction can be limited to a relatively small proportion of the movement required for full scale deflection of the measurement signal. The system is thus largely immune to errors resulting from normal vibrations.

The modulating mirror may be in the form of a part-silvered or a dichroic mirror, light transmitted through the mirror being received by an output lens or reflected back to the input lens. Alternatively a dichroic mirror may be positioned between the input lens and the modulating mirror.

Preferably, the measurement and reference signals are received by p-i-n photodiode receivers linked to a phase sensitive detection and ratio analysis circuit driven by an oscillator which also drives an LED transmitter providing the beam for transmission to the transducer.

BRIEF DESCRIPTION OF THE DRAWINGS

Embodiment of the present invention will now be described by way of example with reference to the accompanying drawings, in which:

FIG. 3 is a cross-sectional view of a transducer of the type illustrated in FIG. 1;

FIG. 4 is a view on line 4—4 of FIG. 3;

FIG. 5 is a cross-sectional view of a further transducer of the type illustrated in FIG. 1;

DESCRIPTION OF THE PREFERRED EMBODIMENTS

Figures 1, 7, 8, 9:
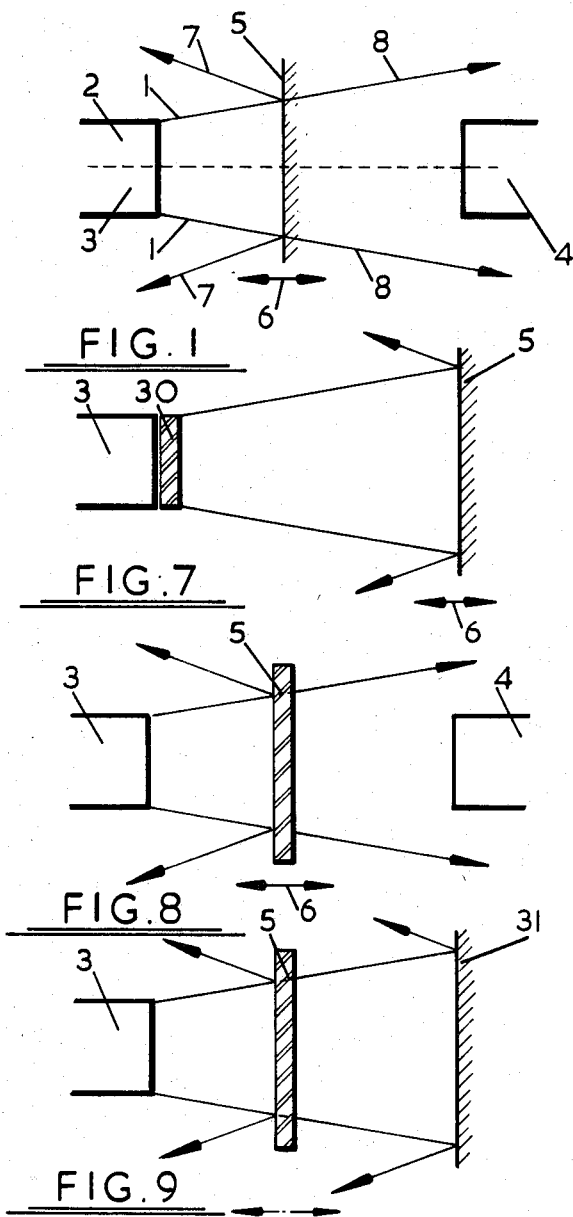
FIG. 1 is a schematic diagram of a first optical transducer according to the invention.
FIGS. 7, 8 and 9 are schematic diagrams respectively of second, third and fourth optical transducers according to the present invention.

Referring to FIG. 1, a light beam the periphery of which is indicated by lines 1 is directed along the axis indicated by dotted line 2 from an input lens 3. An output lens 4 is fixed in position relative to the input lens 3 so as to be coaxial therewith. A modulating mirror 5 is located between the lenses 3 and 4 and movable parallel to the axis 2 as indicated by arrows 6.

The lens 3 is connected to an optical fibre (not shown) which serves to transmit an input optical signal to the lens and to return a measurement signal from the lens. A further optical fibre is connected to lens 4 and serves to transmit a reference signal from the lens 4.

A proportion of the light beam emanating from the lens 3 is reflected by the modulating mirror 5 as indicated by lines 7 whereas a portion of the light beam is transmitted through the mirror 5 towards the lens 4 as indicated by lines 8. As the lenses 3 and 4 are fixed in position relative to each other and the intensity of the light transmitted through the mirror 5 is substantially independent of the position of the mirror 5, the amount of light impinging on the lens 4 represents a predetermined proportion of the light emanating from the lens 3. Thus the light which is transmitted from the lens 4 down its associated optical fibre (not shown) and forming the reference signal is a true representation of the intensity of the light emanating from the lens 3.

On the other hand, the greater the distance between the lens 3 and the mirror 5 the smaller is the proportion of the reflected light which impinges upon the lens 3. Thus the measurement signal which results from the light reflected to the lens 3 is a true representation of the distance between the lens 3 and the mirror 5. Therefore by connecting the mirror 5 to for example a bourdon tube the measurement signal is a representation of the pressure being monitored by that tube. Obviously the mirror 5 may be mechanically coupled to any sensing member, e.g. a diaphragm, a bellows arrangement or a bi-metallic strip.

Typically the mirror 5 will have a range of movement of several millimetres. Thus vibrations of the magnitude normally to be expected in industrial equipment are of a much smaller order of magnitude than the expected movement of the mirror 5 and the device is therefore relatively immune to inaccuracies due to vibration.

Figure 2:
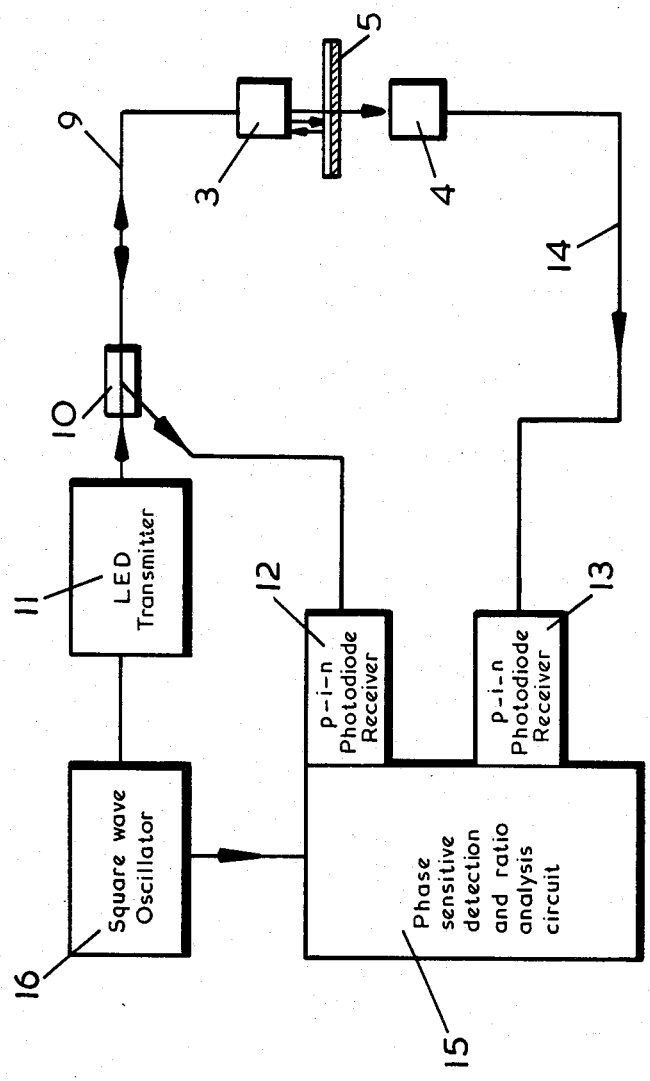
FIG. 2 schematically illustrates an optical measuring system incorporating the transducer shown in FIG. 1.

Referring to FIG. 2 an optical measuring system is illustrated which comprises a transducer of the type illustrated in FIG. 1 in the form of a part silvered mirror 5 positioned between two graded index rod lenses 3 and 4. The mirror may be arranged to transmit 20% of any incident light beam.

An input light beam is delivered to the lens 3 via an optical fibre 9 and 3 dB coupler 10 from an LED transmitter 11 positioned at a remote location. A proportion of the input light beam is reflected to the lens 3 from the mirror 5 and transmitted as a measurement signal via fibre 9 and coupler 10 to a p-i-n photodiode receiver 12. A proportion of the input light beam is transmitted through the mirror 5 to the lens 4 and transmitted as a reference signal back to a p-i-n photodiode 13 at the remote location via an optical fibre 14. The outputs of the receivers 12 and 13 are monitored by a phase sensitive detection and ratio analysis circuit 15. The LED 11 and circuit 15 are driven by a common oscillator 16. The outputs of the receivers 12 and 13 enable the ratio of intensities of the measurement and reference signals to be calculated to provide a measure of the position of the mirror 5 that is independent of variations in the output of the LED 11 or variations in the attenuation of the optical circuit from the LED to the transducer.

The optical fibres 9 and 14 will generally be multimode fibres and the light emitted by the LED transmitter 11 will of course be incoherent. It will be appreciated however that single mode fibres and coherent light sources could be used if economic considerations indicated such techniques to be preferable.

The lenses 3 and 4 may be of any suitable type. Various lens systems are available to provide the beam expansion and collimation necessary to allow for several millimetres of displacement of the mirror 5. For example, spherical ball and rod lens have found wide spread use in the field of fibre optics as expanded beam connectors, switches, isolators, wavelength multiplexers and directional couplers. However, for beam expansion and collimation the quarter pitch graded index rod (hereinafter referred to as a GRIN-rod) lens proves advantageous since its focal point is coincident with its end face, providing easier and superior connection to optical fibres.

GRIN-rod lens coupler losses due to end (longitudinal) separation, lateral (transverse) offset and angular tilt have been theoretically derived. The theoretical end separation loss of commercially available GRIN-rod lenses exhibits two important features which have attractions for use in displacement sensor mechanisms. These are that a significant range of displacement is available and the system is linear over that displacement. End separation loss is largely independent of linking fibre lengths. This contrasts with direct fibre to fibre coupling losses which are dependent on the modal power distribution in both the feed and return fibres.

In the arrangement of FIG. 2, the LED transmitter 11 may be modulated with a 1 KHz square wave with the emitted optical power being launched into a telecommunications standard 50/125 multimode graded index fibre having a numerical aperture of 0.24. The lenses 3 and 4 may be GRIN-rod lenses of the type marketed under the name SELFOC SLS-1.0-0.25P.

Referring now to FIGS. 3 and 4, the illustrated structure is one possible structure for supporting the components of a transducer in accordance with FIG. 1. The structure comprises a rigid aluminium block 17 provided with fixing holes 18 to enable it to be mounted in any desired position. Secured to the block 17 are two support blocks 19 which define tubular housings 20 in which the lenses 3 and 4 are supported. Optical fibres (not shown) extend through the tubular housings 20 to be coupled with the lenses 3 and 4.

The mirror 5 is supported within a cylindrical carriage 21 provided with a PTFE bush 22, the bush 22 bearing against the outside surfaces of the tubular housings 20. Thus the carriage 21 is slidable relative to the tubular housings 20 so as to adjust the position of the mirror 5 relative to the lenses 3 and 4. A bracket 23 is provided for connection to an actuator, for example a bourdon tube.

Referring now to FIG. 5, an alternative structure to that of FIGS. 3 and 4 is illustrated. The input lens 3 is connected to the fibre 9 and supported within a tubular housing 24. The mirror 5 is slidably received within a cylindrical housing 25 that is coaxial with the tubular housing 24. The output lens 4 is independently supported by means not shown so as to be coaxial with the input lens 3.

Figure 6:
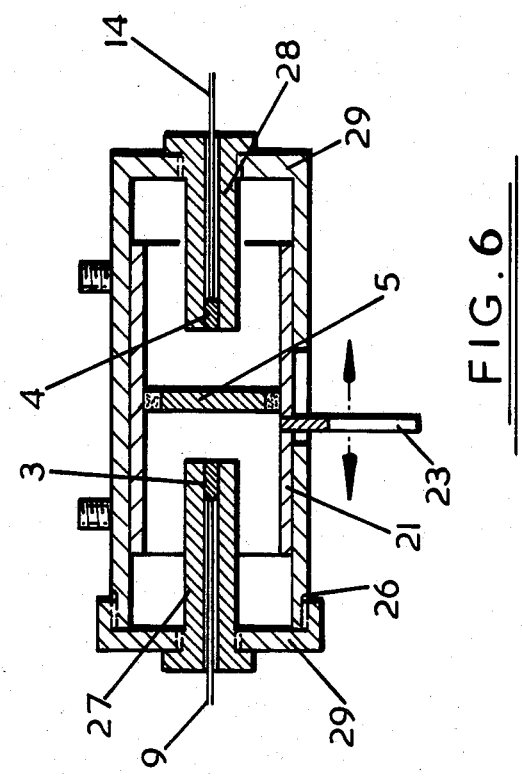
FIG. 6 is a cross-sectional view of a still further transducer of the type illustrated in FIG. 1.

Referring now to FIG. 6, a further alternative to the structure of FIGS. 3 and 4 is illustrated. In the arrangement of FIG. 6 the mirror 5 is supported on the carriage 21 but in contrast to the arrangement of FIG. 3 the carriage 21 is slidably received within a cylindrical housing 26, the lenses 3 and 4 being supported in tubular housings 27 and 28 supported on end caps 29. The bracket 23 extends through a slot in the cylindrical housing 26.

Turning now to FIG. 7, an alternative basic arrangement for the transducer to that illustrated in FIG. 1 is shown. The input lens 3 supports on its end face a dichroic mirror 30 and the mirror 5 is fully reflecting. The lens 3 receives from an optical fibre (not shown) input signals of different optical wavelengths W1 and W2. The dichroic mirror 30 is fully reflecting to the signals of wavelength W1 but transparent to signals of wavelength W2. Thus the signals returned via the input lens 3 to the optical fibre which feeds it comprise a first component of wavelength W1 which is simply reflected directly from the mirror 30 and a second component of wavelength W2 which is modulated in intensity as a function of the position of the mirror 5 relative to the lens 3. This arrangement is advantageous in that only a single fibre is required to transmit both the input optical signals and the reflected reference and measurement signals. As an alternative to supporting a discrete dichroic mirror 30 on the input lens, the surface of the output end of the input lens may be directly treated to achieve the same effect.

Referring now to FIG. 8, input and output lenses 3 and 4 respectively are arranged in relationship to a modulating mirror 5 in the same way as in the case of the embodiment of FIG. 1. In place of the half silvered mirror 5 of FIG. 1 however the modulating mirror 5 of FIG. 8 is a dichroic mirror. Input signals of wavelengths W1 and W2 are delivered via the input lens 3. The signals of wavelength W1 are reflected by the mirror 5 to constitute the measurement signal. The signals of wavelength W2 pass through the mirror 5 and are picked up by the output lens 4 to constitute the reference signal.

Referring now to FIG. 9, a further alternative to the arrangement of FIG. 1 is illustrated. The modulating mirror 5 is in the form of a dichroic mirror and again the input signals delivered by input lens 3 are of wavelengths W1 and W2. The signals at wavelength W1 are reflected back to the input lens 3 to form the measurement signal. The signals of wavelength W2 pass through the dichroic mirror 5 and are reflected by a further fully silvered mirror 31 which is fixed in position relative to the input lens 3. The light reflected by the mirror 31 passes back through the dichroic mirror 5 to the input lens 3 and forms the basis for the reference signal.

What is claimed is:

1. An optical transducer useful for measuring a physical parameter, comprising:

an input lens arranged to direct a light beam along a predetermined optical axis;

a movable mirror which is centered on and movable parallel to the optical axis, the movable mirror being movable in response to a physical parameter, and which is arranged to reflect back to the input lens a measurement signal, the intensity of the measurement signal being related to the position of the movable mirror;

photoreceiving means for converting the measurement signal to a first output signal;

an optical element which is centered on the optical axis in a fixed position relative to the input lens and which is arranged to provide a reference signal from the light beam, the intensity of the reference signal being independent of the position of the movable mirror;

means for converting the reference signal to a second output signal; and means for processing the first and second output signals to adjust the first output signal for at least variations in the intensity of the light beam.

2. An optical transducer according to claim 1, wherein the movable mirror is arranged to reflect part of the light beam to the input lens and to transmit part of the light beam to the optical element.

3. An optical transducer according to claim 2, wherein the movable mirror is partially silvered.

4. An optical transducer according to claim 2, wherein the movable mirror is a dichroic mirror and the light beam comprises a component at a wavelength which is reflected by the movable mirror and a component at a wavelength to which the movable mirror is substantially transparent.

5. An optical transducer according to claim 2, wherein the optical element is an output lens.

6. An optical transducer according to claim 2, wherein the optical element is a fixed mirror arranged to reflect the part of the light beam it receives back to the input lens.

7. An optical transducer according to claim 1, wherein the optical element is a dichroic mirror located between the input lens and the movable mirror and the light beam comprises a component at a wavelength which is reflected by the dichroic mirror and a component at a wavelength to which the dichroic mirror is substantially transparent.

8. An optical transducer according to claim 5, wherein the input and output lenses are supported in coaxial tubular housings and the movable mirror is supported in a tubular carriage which is slidably mounted on the tubular housings.

9. An optical transducer according to claim 1, wherein the input lens is supported in a tubular housing and the movable mirror is slidably mounted in a cylindrical housing coaxial with the tubular housings.

10. An optical transducer according to claim 5, wherein the input and output lenses are supported in coaxial tubular housings and the movable mirror is supported in a tubular carriage which is slidably mounted in a cylindrical housing coaxial with and supporting the tubular housings.

11. An optical transducer according to claim 1, wherein the photoreceiving means and the means for converting the reference signal are separate p-i-n photodiode receivers connected to receive the measurement and reference signals, and the means for processing the first and second output signals includes a phase sensitive detection and ratio analysis circuit linked to the receivers, an LED transmitter providing the light beam, and an oscillator driving the analysis circuit and the LED transmitter.

* * * * *